(12) United States Patent
Oh

(10) Patent No.: US 7,418,673 B2
(45) Date of Patent: Aug. 26, 2008

(54) THUMBNAIL IMAGE BROWSING METHOD IN AN EMBEDDED SYSTEM

(75) Inventor: Hyo-Seob Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 866 days.

(21) Appl. No.: 10/406,987

(22) Filed: Apr. 3, 2003

(65) Prior Publication Data

US 2003/0191756 A1 Oct. 9, 2003

(30) Foreign Application Priority Data

Apr. 8, 2002 (KR) .............................. 2002-19025

(51) Int. Cl.
*G06F 3/00* (2006.01)
*G06F 3/14* (2006.01)

(52) U.S. Cl. .................. 715/838; 715/765; 715/835

(58) Field of Classification Search ............... 715/733, 715/738, 764, 765, 835, 838, 846; 707/200, 707/205, 204; 345/619, 620, 634
See application file for complete search history.

(56) References Cited

U.S. PATENT DOCUMENTS

| | | | | |
|---|---|---|---|---|
| 5,164,831 | A * | 11/1992 | Kuchta et al. ............. | 348/231.7 |
| 5,557,728 | A * | 9/1996 | Garrett et al. ............... | 715/801 |
| 6,317,221 | B1 * | 11/2001 | Aikawa et al. ................ | 358/1.9 |
| 6,335,742 | B1 * | 1/2002 | Takemoto ..................... | 715/781 |
| 6,426,771 | B1 * | 7/2002 | Kosugi ..................... | 348/222.1 |
| 6,456,732 | B1 * | 9/2002 | Kimbell et al. .............. | 382/112 |
| 6,535,228 | B1 * | 3/2003 | Bandaru et al. .............. | 715/752 |
| 6,545,687 | B2 * | 4/2003 | Scott et al. ................... | 345/629 |
| 6,664,972 | B2 * | 12/2003 | Eichel et al. ................ | 345/582 |
| 6,738,532 | B1 * | 5/2004 | Oldroyd ...................... | 382/294 |
| 6,753,890 | B2 * | 6/2004 | Sanbe ........................ | 715/788 |
| 7,117,256 | B1 * | 10/2006 | Blinn ........................ | 709/219 |
| 2001/0050712 | A1 * | 12/2001 | Dunton et al. .............. | 348/220 |
| 2002/0135621 | A1 * | 9/2002 | Angiulo et al. ............. | 345/838 |
| 2002/0149624 | A1 * | 10/2002 | Lee et al. ..................... | 345/765 |
| 2004/0125130 | A1 * | 7/2004 | Flamini et al. .............. | 345/738 |
| 2005/0057593 | A1 * | 3/2005 | Kachi .......................... | 347/14 |

FOREIGN PATENT DOCUMENTS

| | | |
|---|---|---|
| JP | 2002-024064 | 1/2002 |
| JP | 2002-027387 | 1/2002 |

OTHER PUBLICATIONS

Microsoft Paint, version 4.0, 1998, screenshots p. 1-10.*

* cited by examiner

*Primary Examiner*—X. L Bautista
(74) *Attorney, Agent, or Firm*—Lee, Hong, Degerman, Kang & Schmadeka

(57) ABSTRACT

In accordance with one aspect of the invention, a method of viewing images accessible by an embedded system, the method comprises: generating a trimmed image from an original image accessible by an embedded system, wherein the trimmed image's dimension are relatively smaller or equal to the dimensions of the original image; generating a thumbnail image from the trimmed image, such that dimensions of the thumbnail image are relatively smaller and directly proportional to the respective dimensions of the trimmed image; and associating the thumbnail image with the original image so that in response to selection of the thumbnail image the original image is displayed on the embedded system's display unit.

35 Claims, 5 Drawing Sheets

THUMBNAIL IMAGE BROWSING METHOD IN AN EMBEDDED SYSTEM

CROSS-REFERENCE TO RELATED APPLICATIONS

Pursuant to 35 U.S.C. § 119(a), this application claims the benefit of earlier filing date and right of priority to the Korean Application No. 2002-19025, filed on Apr. 8, 2002, the content of which is hereby incorporated by reference herein in its entirety.

BACKGROUND OF THE INVENTION

1. Field of the Invention

The present invention relates to image browsing and, more particularly, to a thumbnail image browsing method in an embedded system.

2. Background of the Related Art

Generally, an image viewer or file browser in a personal computer (PC) has a function for displaying an image file (original image) as a smaller sized image (thumbnail). Such a function is called a thumbnail image browsing feature.

Once a user executes the thumbnail image browsing feature on a web page or client system, an image viewer (or file browser) decodes a compressed image so as to generate an original image. The image viewer then generates a thumbnail image from the original image so as to display the thumbnail image on the screen.

The above described thumbnail image browsing feature can be executed in a PC having a large screen, a relatively powerful CPU, and plenty of resources (e.g., memory, etc.) with ease. However, an embedded system having limited resources, such as a mobile communication terminal, has the following problems or disadvantages.

First, a thumbnail image browsing feature of the related art generates the original image by decoding a compressed image, and then generates the thumbnail image from the original image. Decompression and regeneration of the image are both resource and time consuming processes. A user can visually sense the generation speed of a thumbnail image on a screen, even in a PC. When a plurality of images is generated, the generation speed of the thumbnail image decreases due to the over-utilization of resources required for the purpose of performing the image browsing function. Since a mobile communication terminal has very limited resources, the thumbnail image browsing method according to the related art fails when applied to the mobile communication terminal.

Furthermore, in the method of the related art, thumbnail images are generated in predetermined fixed sizes, so that original images with various sizes are generated as thumbnails that are of same fixed size. Referring to FIG. 1, the height to width ratio of a thumbnail generated by the method of the related art is incongruent to that of the original image in cases where the dimensional properties of the original image differ from the thumbnail's predetermined fixed dimensions. Particularly, when the disproportion between the original and the thumbnail image dimensions is large, the thumbnail image fails to be an accurate, or even at times an approximate representation of the original image. This misrepresentation occurs because the thumbnail image is modified disproportionately in one dimension in order to force an exact fit into the predetermined fixed size.

In some cases, instead of modifying the image to fit the fixed thumbnail dimensions, the thumbnail image proportionally is similar to the original image, but the border areas of the image are filled to fully cover the areas within the predetermined fixed size of the thumbnail. Such irregular thumbnail images occupy valuable display space on an embedded system. A method and system is needed that can facilitate a more efficient and presentable image browsing feature in embedded system, such as a mobile communication terminal.

SUMMARY OF THE INVENTION

In accordance with one aspect of the invention a thumbnail image browsing method in an embedded terminal is provided that improves the display speed of a thumbnail image. Also, the method uses the display space more efficiently by providing a uniform-sized thumbnail image of an original image regardless of the size of the original image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In accordance with one aspect of the invention, a method of viewing images accessible by an embedded system, the method comprises: generating a trimmed image from an original image accessible by an embedded system, wherein the trimmed image's dimension are relatively smaller or equal to the dimensions of the original image; generating a thumbnail image from the trimmed image, such that dimensions of the thumbnail image are relatively smaller and directly proportional to the respective dimensions of the trimmed image; and associating the thumbnail image with the original image so that in response to selection of the thumbnail image the original image is displayed on the embedded system's display unit.

In some embodiments, the thumbnail image is associated with the original image so that any file management operations performed on the thumbnail image is also performed on the original image. The trimmed image is then stored on a storage medium readily accessible by the embedded system and the trimmed image is trimmed on its borders based on the orientation of the original image. Further, the trimmed image is trimmed along its height, if the original image has a width X smaller than a height Y. The trimmed image is trimmed along its width, if the original image has a width X longer than a height Y.

In certain embodiments, the trimmed image is trimmed along its height according to the following relationship: if $mY > (Y-X)$, then lower border of the original image is trimmed by $Y-X$ to produce the trimmed image; wherein $0 < m < 1.28$. The method of claim 25, wherein the trimmed image is trimmed along its height according to the following relationship: if $mY < (Y-X)$, then upper border of the original image is trimmed by $mY$ and lower border of original image is trimmed by $mY-X$ in order to produce the trimmed image, wherein $0 < m < 1$.

In another embodiment, the trimmed image is trimmed along its width by $m(X-Y)$ at its right and left border, wherein $0 < m < 1$. The thumbnail image has predetermined fixed dimensions. When, the original image has dimensions X and Y, respectively associated with the width and height of the original image, the trimmed image has dimension X1 and Y1, respectively associated with the width and height of the trimmed image, such that if $X > Y$ then X1 and Y1 are trimmed so that $X1 = Y$ and $Y1 = Y$.

Further, if the original image has dimensions X and Y, respectively associated with the width and height of the original image, the trimmed image has dimension X1 and Y1, respectively associated with the width and height of the trimmed image, such that if X<Y then X1 and Y1 are trimmed so that X1=X and Y1=X, for example.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

DETAILED DESCRIPTION OF THE PREFERRED EMBODIMENTS

By way of example, this invention in accordance with one or more embodiments is described as applicable to a mobile communication system. This application, however, should not be construed as limiting the scope of the invention to such systems only. The methods and features disclosed herein may be applicable to all other embedded and non-embedded systems that incorporate a display unit, such as cameras, video camcorders, personal digital assistants and other similar devices.

In order to realize thumbnail image browsing in a system with limited resources, the present invention generates and stores an additional thumbnail image whenever an original image is inputted. The stored thumbnail image is then decoded and displayed instead of decoding the original image. The present invention manages the original image and a corresponding thumbnail image in a synchronized fashion. That is, any operation performed on the thumbnail image would be also performed on the corresponding original image and vice versa.

For example, if the original image is generated and erased, the thumbnail image is generated and erased too. If the original image is moved to another directory or its file name is amended, the directory or file associated with the thumbnail image is modified accordingly.

Figure 1:
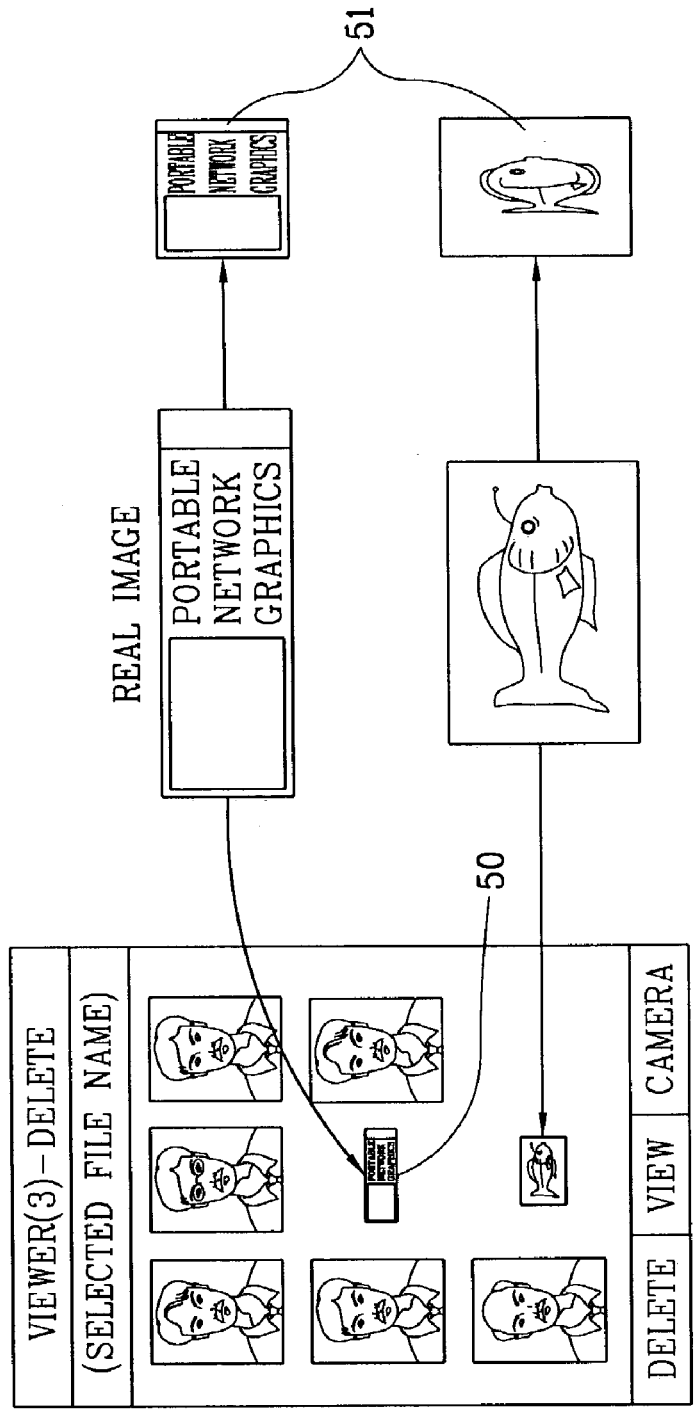
FIG. 1 is a diagram illustrating a thumbnail viewer, in accordance with one or more embodiments of the invention.
Figure 2:
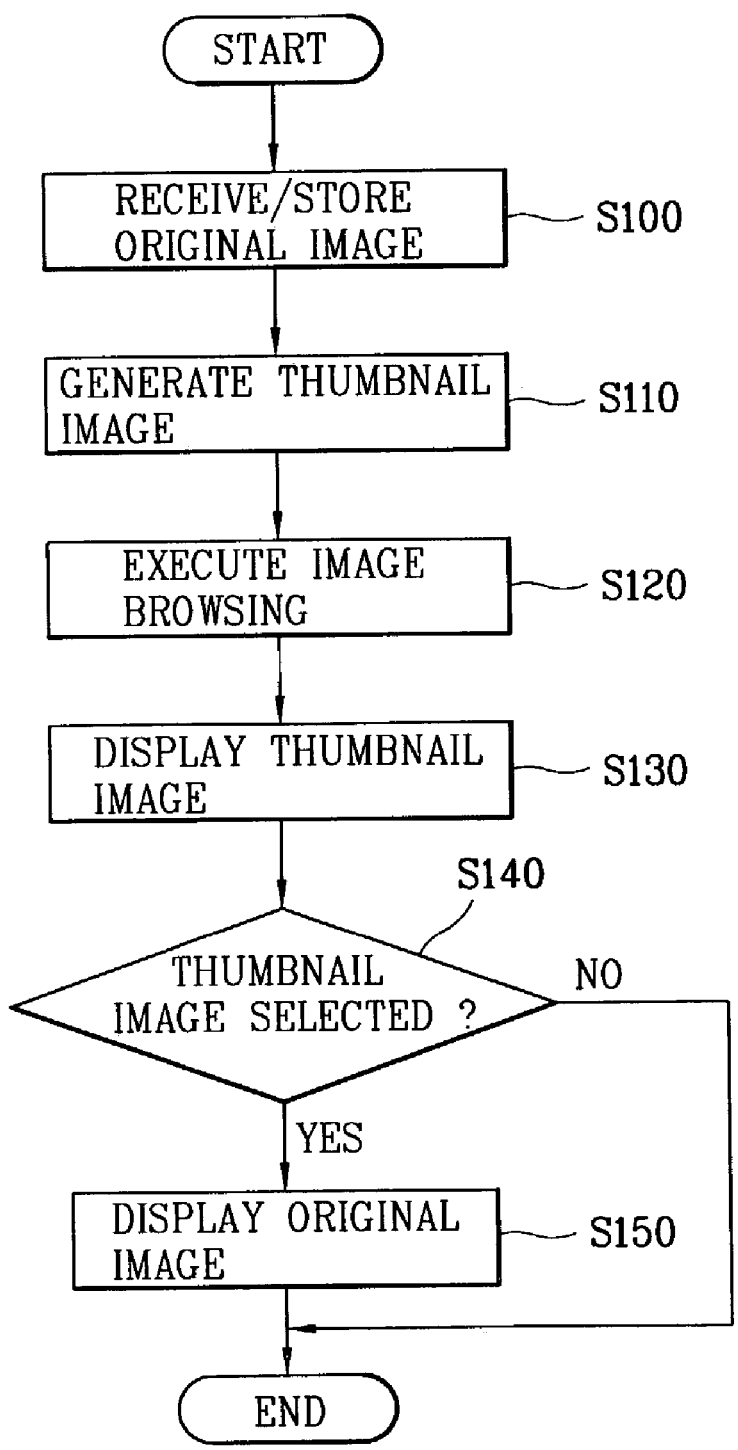
FIG. 2 illustrates a flowchart of a method of browsing a thumbnail image, in accordance with one or more embodiments of the invention.

Referring to FIG. 2, when an image receiving event is generated (e.g., image download, image photographing, e-mail reception, etc.) a mobile communication terminal (hereinafter referred to as "terminal") stores a received original image (at state S100), and, from the original image, simultaneously generates and stores a thumbnail image having a predetermined size (at state S110).

In one or more embodiments, file names and storage locations of the original and thumbnail images are set up so as to be synchronized with each other. For example, if the file name of the original image is "Fred.jpg", the thumbnail image is set up with "s_Fred.jpg" as its file name. Obviously, other implementations are possible. If a storage directory (e.g., main directory) of the original image is "\Image\", a storage directory (e.g., sub-directory) of the thumbnail can be "\Image\sImage\", for example. In some embodiments, the original image may not even be stored on the embedded system, but may be accessible through a pointer to the location of storage (e.g., a local area network server connected to the embedded system via wired or wireless communication means).

When a user activates the thumbnail image browsing feature, the terminal decodes the file stored in the subdirectory instead of the original image so as to display the thumbnail image on a screen (at states S120 and S130). If the user selects a corresponding thumbnail image in the course of image browsing, the terminal decodes a file stored in the main directory so as to display the original image (at states S140 and S150).

Figure 3:
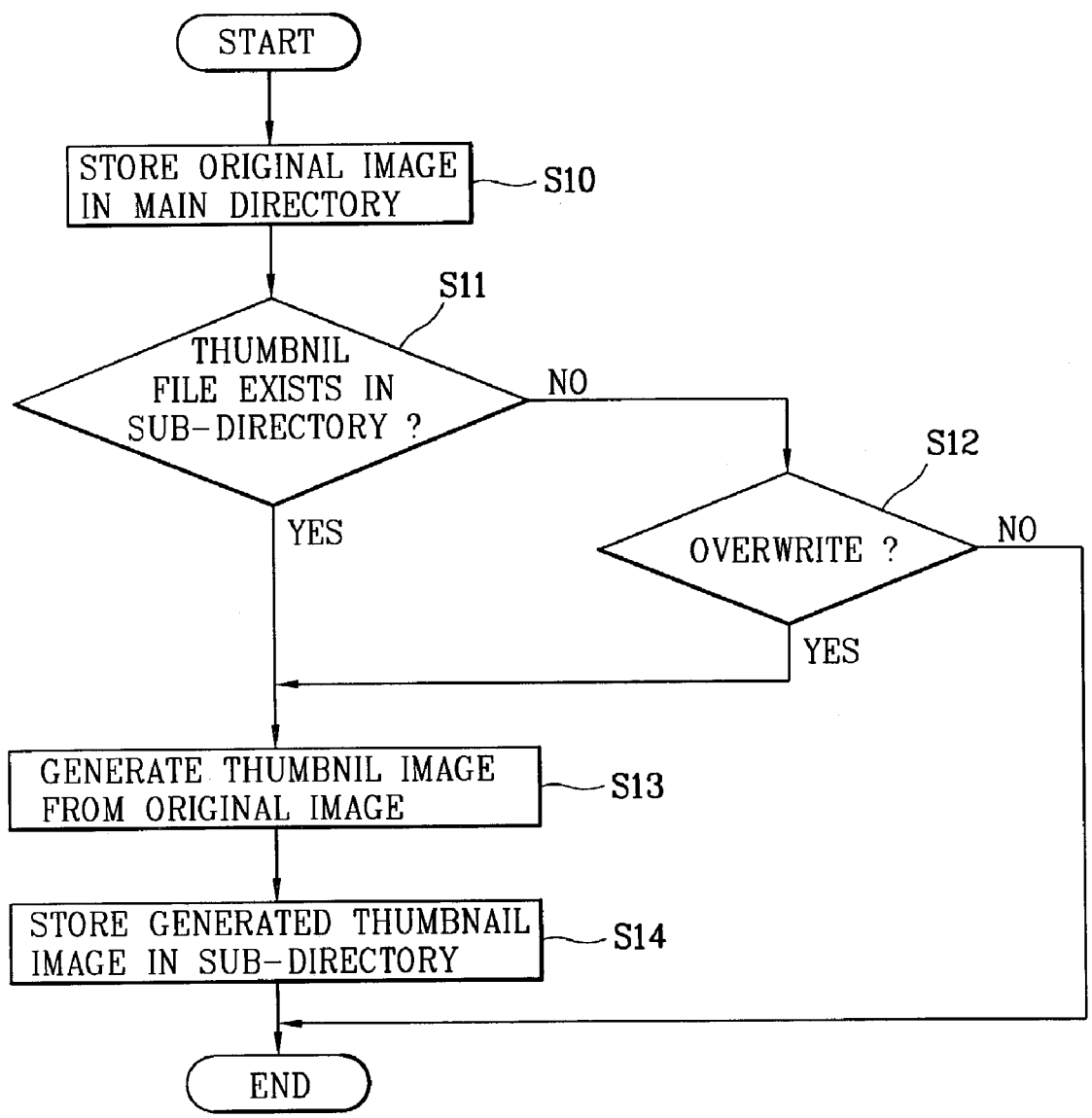
FIG. 3 illustrates a flowchart of a method of generating a thumbnail image in accordance with one or more embodiments of the invention.

Referring to FIG. 3, when an image is received by the terminal, the terminal stores the received original image in a first director, for example, a main directory (at state S10). For illustration purposes, the file name and the main directory of the original image are "Fred.jpg" and "\Image\", respectively.

Once the original image is stored in the main directory \Image\, the terminal determines whether a thumbnail file exists in a second directory, for example, a sub-directory of the main directory \image\ (at state S11). For example, the file name and sub-directory of the thumbnail image may be "s_Fred.jpg" and "/Image/sImage/", respectively.

If the thumbnail file s_Fred.jpg is not stored in the sub-directory, the terminal generates a corresponding thumbnail image from the original image. If the thumbnail file s_Fred.jpg already exists in the sub-directory, the terminal may, for example, output an "overwrite message" to the user and generate a new thumbnail image if and when an overwrite storage is approved (at states S12 and S13).

In order to generate a thumbnail image, the original image can be divided into multiple forms, such as an image having a length Y longer than a width X (i.e., Y>X), an image having a length Y shorter than a width X (i.e., Y<X), and a square image (i.e., Y=X), for example. In accordance with one aspect of the invention, an image having a length Y longer than the width X (i.e., Y>X) can be a portrait, for example. A landscape picture, for example, may be in a format having a width X longer than a length Y (i.e., Y<X).

Figure 4C:
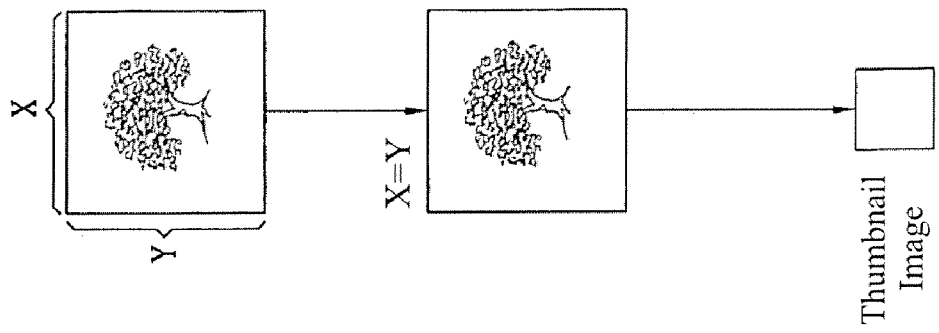
FIGS. 4A-4C illustrate diagrams of a square thumbnail image being generated from an original image in accordance with one or more embodiments of the invention.
Figure 4B:
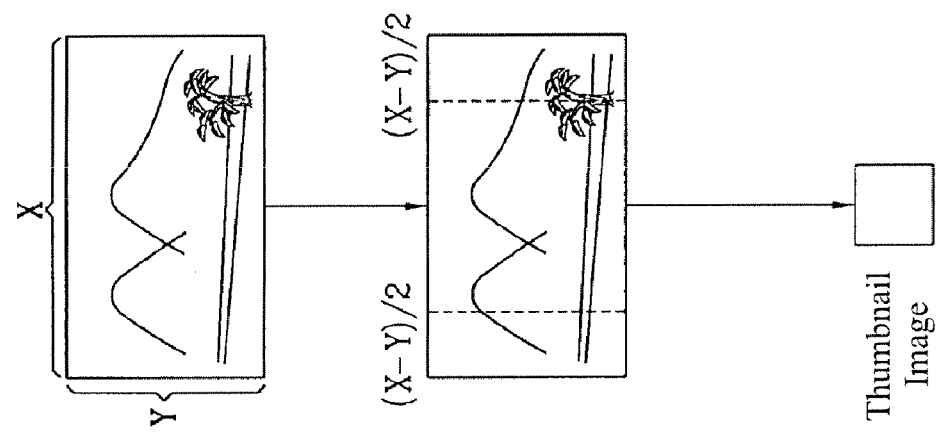
Figure 4A:
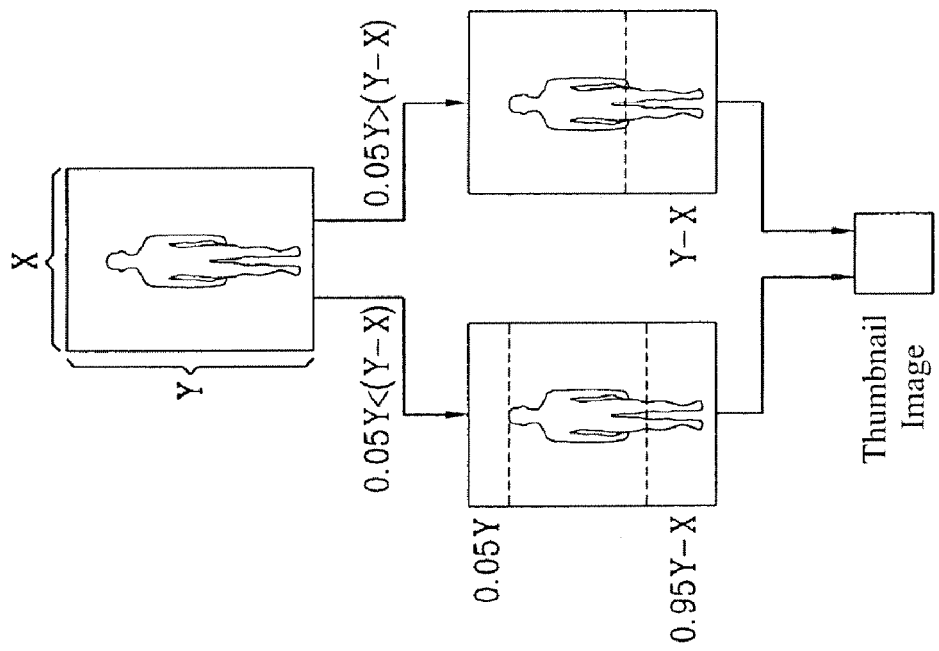

Therefore, in accordance with one embodiment of the present invention, as shown in FIG. 4A, an image having a length longer than its width may be trimmed on its upper and lower borders so as to generate a trimmed image. Alternatively, in accordance with another embodiment, the lower portion of the image may be trimmed to generate the trimmed image. In certain embodiments, the trimming is performed so that the trimmed image is of an exact predetermined size (e.g., a square). For example, referring to FIG. 4A, in one embodiment, if X represents the width and Y represents the length of the original image, the image dimension are trimmed based on the following relationships where "m" is a variable that is assigned a certain value:

a) if mY<(Y−X) then the upper and lower borders are trimmed by mY and mY−X, respectively; and b) if mY>(Y−X) then the lower border only is trimmed by Y−X;

In one embodiment, m is a value between 0 and 1 (i.e., o<m<1). For example, m may be equal to "0.05" (i.e., m=0.05). In other embodiments m can be any other value suitable for trimming the original image.

If an image has a width that is longer than its length, since important objects generally lie at the central portion of the image, in one embodiment, right and left portions of the image are trimmed so as to generate a square image as shown in FIG. 4B. The trimmed image, as shown in FIG. 4C, undergoes no further processing, in one embodiment of the invention. In other embodiments, however, it may be processed further as provided below.

For example, once the trimmed image is generated, the terminal processes the trimmed image so as to generate a thumbnail image, and then stores the generated thumbnail image in a sub-directory.

Figure 5:
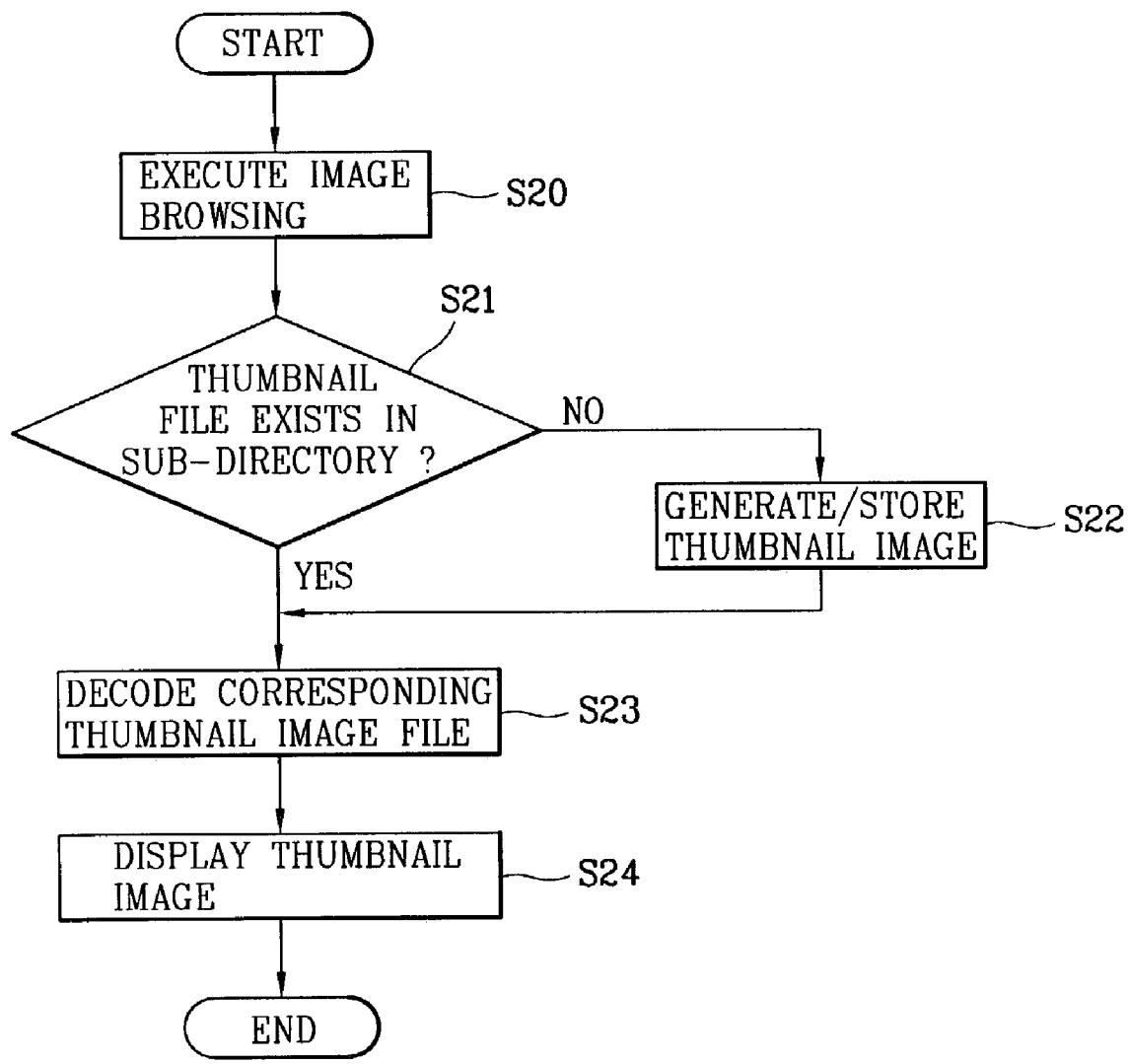
FIG. 5 illustrates a flowchart of a method of displaying a thumbnail image in accordance with one or more embodiments of the invention.

Referring to FIG. 5, when a user executes the terminal's thumbnail browsing feature for a specific file, such as "Fred.jpg" (at state S20) the terminal checks whether a thumbnail file (s_Fred.jpg) exists in a corresponding sub-directory (/Image/sImage)(at state S21), to verify any possible errors.

If the thumbnail file is not stored in the corresponding sub-directory, a new thumbnail image is generated (at state S22). If the thumbnail file exists, the file ("s_Fred.jpg") is decoded so as to display the thumbnail image(at state S23).

For illustration purposes, the present invention is described with reference to processing a single image file. It should be noted, however, that the present invention can be applied to a plurality of image files as well.

The described browsing method allows an embedded system with limited resources to adequately handle the processing of image files that have been reduced in a more efficient and practical manner.

Further, since the present invention decodes the thumbnail image for display instead of the original image, processing time for image generation is substantially reduced. This allows for the thumbnail image to be displayed faster and stored more efficiently.

Moreover, the present invention generates a thumbnail image from the original image in such a manner that provides a user with a better image browsing experience, where the display area is used more efficiently and effectively.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A thumbnail image browsing method in a mobile communication terminal, the method comprising:
   generating a trimmed image from an original image stored in the mobile communication terminal, wherein the trimmed image is generated from the original image in accordance with a predetermined set of trimming rules stored in the mobile communication terminal; and
   generating a thumbnail image for display on a screen of the mobile communication terminal from the trimmed image prior to receiving a request for rendering the thumbnail image on the display of the mobile communication terminal,
   wherein the thumbnail image is associated with the original image for the purpose of file management, such that any file management operation performed on the thumbnail image is also performed on the original image,
   wherein the file management operation comprises a move operation that allows both the original image and the thumbnail image to be transferred and an erase operation that allows both the original image and the thumbnail image to be deleted.

2. The method of claim 1, further comprising;
   displaying the thumbnail image on the display of the mobile communication terminal, in response to receiving a request to render the thumbnail image on the display of the mobile communication terminal.

3. The method of claim 2, further comprising:
   displaying the original image in response to selection of the displayed thumbnail image.

4. The method of claim 1, wherein the trimmed image has predefined dimensions dictated by said predetermined set of trimming rules.

5. The method of claim 4, wherein the predefined dimensions are such that the trimmed image has a width equal in size to its length.

6. The method of claim 1 further comprising:
   storing the original image in a first directory;
   determining whether a thumbnail image associated with the original image exists in a second directory;
   generating a trimmed image from the original image if the thumbnail image fails to exist;
   generating a thumbnail image from the trimmed image; and
   storing the generated thumbnail image in the second directory.

7. The method of claim 6, wherein the second directory is a sub-directory of the first directory.

8. The method of claim 1, wherein the original image has a width X and a length Y, and wherein the trimmed image has a length smaller than Y, if Y is greater than X.

9. The method of claim 1, wherein the original image has a width X and a length Y, and wherein the trimmed image has a width smaller than X, if Y is smaller than X.

10. The method of claim 1, wherein the original image has a width X and a length Y, and m is a value greater than zero, wherein if mY<(Y−X) then upper border of the original image is trimmed by mY and lower border of original image is trimmed by mY−X in order to produce the trimmed image.

11. The method of claim 1, wherein the original image has a width X and a length Y, and m is a value greater than zero, wherein if mY>(Y−X) then lower border of the original image is trimmed by Y−X to produce the trimmed image.

12. The method of claim 10, wherein the value of m is between 0 and 1.

13. The method of claim 10, wherein the value of m is approximately 0.05.

14. The method of claim 11, wherein the value of m is between 0 and 1.

15. The method of claim 11, wherein the value of m is approximately 0.05.

16. The method of claim 1, wherein the original image has a width X and a length Y, and m is a value greater than zero, wherein if X>Y then side borders of the original image are trimmed by m(X−Y) each to produce the trimmed image.

17. The method of claim 16, wherein m is a value between 0 and 1.

18. The method of claim 16, wherein m is approximately 0.5.

19. The method of claim 1, wherein the original image has a width X and a length Y, wherein if X=Y then borders of the original image are not trimmed.

20. A method of viewing images accessible by a limited processing and limited display device, the method comprising:

generating a trimmed image from an original image accessible by the limited processing and limited display device, wherein the trimmed image's dimension are relatively smaller or equal to the dimensions of the original image;

generating a thumbnail image from the trimmed image, such that dimensions of the thumbnail image are relatively smaller and directly proportional to the respective dimensions of the trimmed image, prior to receiving a request for displaying the thumbnail image on a screen of the limited processing and limited display device;

associating the thumbnail image with the original image so that in response to selection of the thumbnail image, the original image is displayed on the limited processing and limited display device; and associating the thumbnail image with the original image so that any file management operations performed on the thumbnail image are also performed on the original image, wherein the any file management operations comprise a move operation that allows both the original image and the thumbnail image to be transferred when either the original image or the thumbnail image is transferred, and an erase operation that allows both the original image and the thumbnail image to be deleted when either the original image or the thumbnail image is deleted.

21. The method of claim 20 further comprising:

storing the trimmed image on a storage medium readily accessible by the limited processing and limited display device.

22. The method of claim 20 wherein the trimmed image is trimmed on its borders based on the orientation of the original image.

23. The method of claim 20, wherein the trimmed image is trimmed along its height, if the original image has a width X smaller than a height Y.

24. The method of claim 23, wherein the trimmed image is trimmed along its height according to the following relationship:

if $mY>(Y-X)$, then lower border of the original image is trimmed by $Y-X$ to produce the trimmed image; wherein $0<m<1$.

25. The method of claim 23, wherein the trimmed image is trimmed along its height according to the following relationship:

if $mY<(Y-X)$, then upper border of the original image is trimmed by $mY$ and lower border of original image is trimmed by $mY-X$ in order to produce the trimmed image, wherein $0<m<1$.

26. The method of claim 20, wherein the trimmed image is trimmed along its width, if the original image has a width X longer than a height Y.

27. The method of claim 26, wherein the trimmed image is trimmed along its width by $m(X-Y)$ at its right and left border, wherein $0<m<1$.

28. The method of claim 20, wherein the thumbnail image has predetermined fixed dimensions.

29. The method of claim 20, wherein the original image has dimensions X and Y, respectively associated with the width and height of the original image, and the trimmed image has dimension X1 and Y1, respectively associated with the width and height of the trimmed image, such that if $X>Y$ then X1 and Y1 are trimmed so that $X1=Y$ and $Y1=Y$.

30. The method of claim 20, wherein the original image has dimensions X and Y, respectively associated with the width and height of the original image, and the trimmed image has dimension X1 and Y1, respectively associated with the width and height of the trimmed image, such that if $X<Y$ then X1 and Y1 are trimmed so that $X1=X$ and $Y1=X$.

31. A method for displaying images on a display of a mobile device, the method comprising:

producing a second image from a first image stored in a mobile communication terminal, wherein the first image has a higher resolution than the second image, wherein the second image is generated, before a request for displaying the second image is received, and wherein the second image and the first image are associated such that any image processing operation performed on the first image is also performed on the second image and any image processing operation performed on the second image is also performed on the first image, and wherein the second image is produced from a cropped version of the first image.

32. The method of claim 31 further comprising displaying the second image on a display screen of the mobile device, in response to receiving a request for displaying the second image.

33. The method of claim 31 further wherein the second image is produced from a reduced version of the first image.

34. The method of claim 33, wherein the reduced version of the first image comprises shrunken version of the first image.

35. The method of claim 34, wherein the shrunken version of the first image has the same height-width aspect ratio as the first image.

* * * * *